US012394875B2

(12) United States Patent
Uemichi

(10) Patent No.: US 12,394,875 B2
(45) Date of Patent: Aug. 19, 2025

(54) FILTER DEVICE COMPRISING A SUBSTRATE HAVING STRIP-SHAPED CONDUCTORS AND GROUND RECESSES OF LENGTHS LONGER THAN THE STRIP-SHAPED CONDUCTORS

(71) Applicant: FUJIKURA LTD., Tokyo (JP)

(72) Inventor: Yusuke Uemichi, Sakura (JP)

(73) Assignee: Fujikura Ltd., Tokyo (JP)

( * ) Notice: Subject to any disclaimer, the term of this patent is extended or adjusted under 35 U.S.C. 154(b) by 178 days.

(21) Appl. No.: 18/019,848

(22) PCT Filed: Mar. 22, 2021

(86) PCT No.: PCT/JP2021/011617
§ 371 (c)(1),
(2) Date: Feb. 6, 2023

(87) PCT Pub. No.: WO2022/044406
PCT Pub. Date: Mar. 3, 2022

(65) Prior Publication Data

US 2023/0282952 A1 Sep. 7, 2023

(30) Foreign Application Priority Data

Aug. 25, 2020 (JP) ................................ 2020-142046

(51) Int. Cl.
*H01P 1/203* (2006.01)

(52) U.S. Cl.
CPC .......... *H01P 1/20363* (2013.01); *H01P 1/203* (2013.01); *H01P 1/20336* (2013.01)

(58) Field of Classification Search
CPC .. H01P 1/2088; H01P 1/2002; H01P 1/20363; H01P 1/203; H01P 1/20336
USPC .................................................. 333/202, 204
See application file for complete search history.

(56) References Cited

U.S. PATENT DOCUMENTS 3,879,690 A 4/1975 Golant et al.
5,028,896 A 7/1991 Kuokkanen
5,343,176 A 8/1994 Hasler
(Continued)

FOREIGN PATENT DOCUMENTS

CN 1086356 A 5/1994
CN 1372379 A 10/2002
CN 101071895 A 11/2007
(Continued)

OTHER PUBLICATIONS

International Search Report dated May 18, 2021, issued in counterpart International application No. PCT/ JP2021/011617, with English translation. (6 pages).
(Continued)

*Primary Examiner* — Benny T Lee
(74) *Attorney, Agent, or Firm* — Tsuyoshi Nakamura

(57) ABSTRACT

This invention can reduce the size of a filter device as compared to a conventional filter device having the same coupling degree. A filter device (1) includes: a substrate (11); strip-shaped conductors (**12*a*1 to 12*a*5); and a ground conductor layer (13), an area facing an area interposed between adjacent ones of the strip-shaped conductors (between 12*a*1**
(Continued)

and 12$a$2 and between 12$a$2 and 12$a$3) having a first recessed portion (recessed portions 11$a$1 and 11$a$2) having a surface covered with the ground conductor layer (13).

6 Claims, 10 Drawing Sheets

(56) References Cited

U.S. PATENT DOCUMENTS

| | | | | |
|---|---|---|---|---|
| 2009/0231064 | A1* | 9/2009 | Bates et al. ........... | H01P 1/2088<br>333/208 |
| 2023/0049841 | A1 | 2/2023 | Asahi | |

FOREIGN PATENT DOCUMENTS

| | | | |
|---|---|---|---|
| CN | 101630764 | A | 1/2010 |
| CN | 102394326 | A | 3/2012 |
| CN | 107134609 | A | 9/2017 |
| CN | 109449546 | A | 3/2019 |
| CN | 110495047 | A | 11/2019 |
| CN | 210167487 | U | 3/2020 |
| GB | 761787 | A | 11/1956 |
| JP | S62-196402 | U | 12/1987 |
| JP | H04-29203 | U | 3/1992 |
| JP | H06-37416 | A | 2/1994 |
| JP | H09-139605 | A | 5/1997 |
| JP | H10-22702 | A | 1/1998 |
| JP | 2006-109236 | A | 4/2006 |
| JP | 2011-050045 | A | 3/2011 |
| JP | 2015-015560 | A | 1/2015 |
| JP | 2019-176348 | A | 10/2019 |
| KR | 19990030747 | A | 5/1999 |

OTHER PUBLICATIONS

Written Opinion dated May 18, 2021, issued in counterpart International application No. PCT/JP2021/011617, with English translation. (10 pages).

International Search Report dated May 18, 2021, issued in related International application No. PCT/JP2021/011615, with English translation. (5 pages).

Written Opinion dated May 18, 2021, issued in related International application No. PCT/JP2021/011615, with English translation. (8 pages).

Non-Final Office Action dated Nov. 21, 2024, issued in U.S. Appl. No. 18/019,017. (13 pages).

Related co-pending U.S. Appl. No. 18/019,017.

Shen, Y. et al., Miniaturised substrate integrated waveguide cavities in dual-band filter and diplexer design, , IET Microwaves, Antennas & Propagation, vol. 14, Iss 5, p. 428-434, 2020. (7 pages); cited in CN Office Action dated Feb. 22, 2025.

Huang, J. et al., Novel Ultra-Wideband Bandpass Filters With a Simple Microstrip/CPW Structure, Chinese Journal of Electron Devices, vol. 36, No. 6, Dec. 2013, with English Abstract. (4 pages); cited in CN Office Action dated Feb. 22, 2025.

Xu, J. et al., Design of ultra-wideband filter based on couled CPW/Microstrip, Applied Science and Technology, vol. 40, No. 3, Jun. 2013, with English Abstract. (3 pages); cited in CN Office Action dated Feb. 22, 2025.

Office Action dated Feb. 22, 2025, issued in counterpart CN Application No. 202180028838.X. (7 pages).

Ferrer, I. et al., A 60 GHz Image Rejection Filter Manufactured Using a High Resolution LTCC Screen Printing Process, 33ed European Microwave Conference—Munich 2003, p. 423-425. (4 pages); cited in CN Allowance dated Jun. 2, 2025.

* cited by examiner

FILTER DEVICE COMPRISING A SUBSTRATE HAVING STRIP-SHAPED CONDUCTORS AND GROUND RECESSES OF LENGTHS LONGER THAN THE STRIP-SHAPED CONDUCTORS

TECHNICAL FIELD

The present invention relates to a filter device.

BACKGROUND ART

Figure 3:
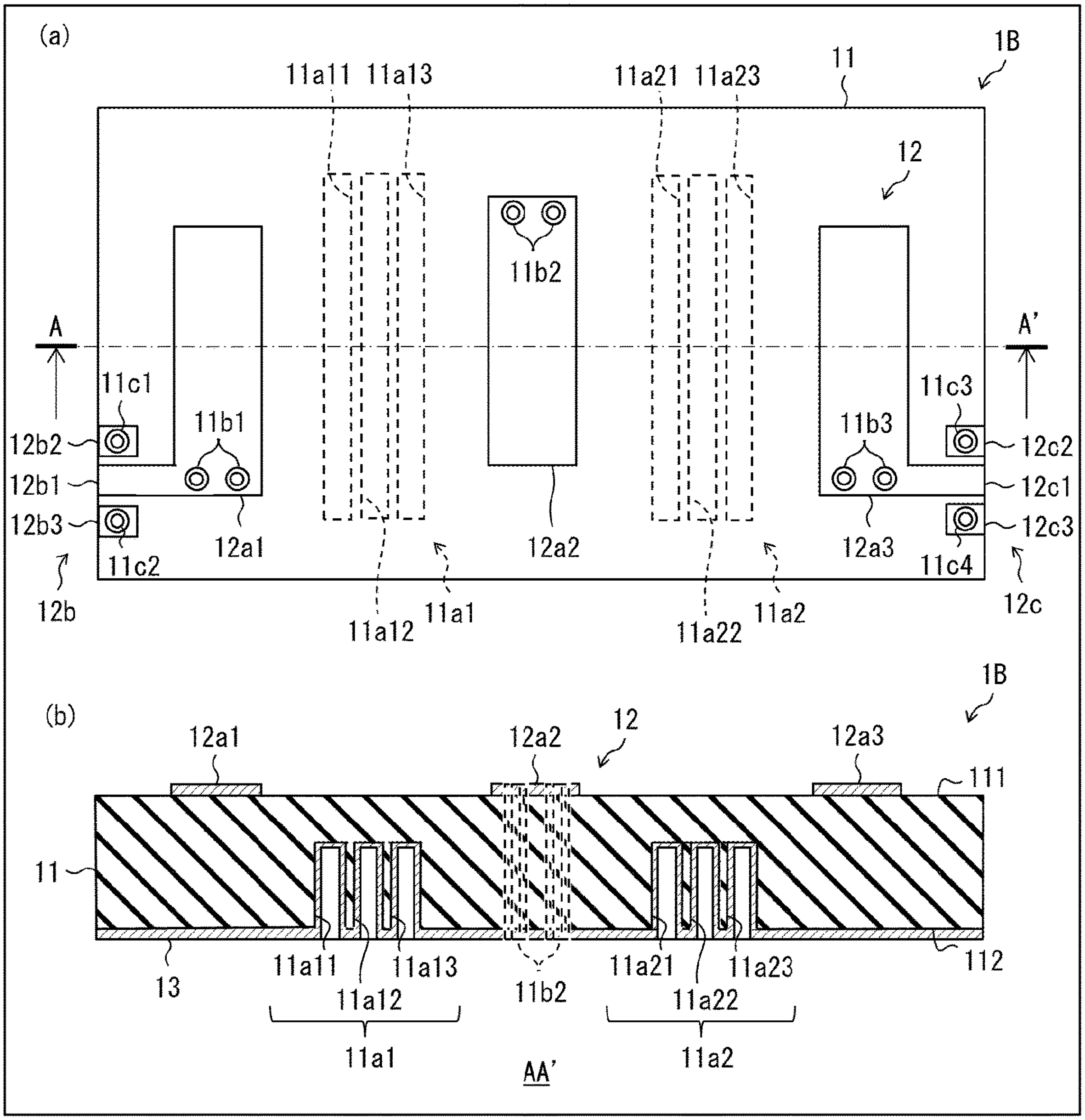
Figure 4:
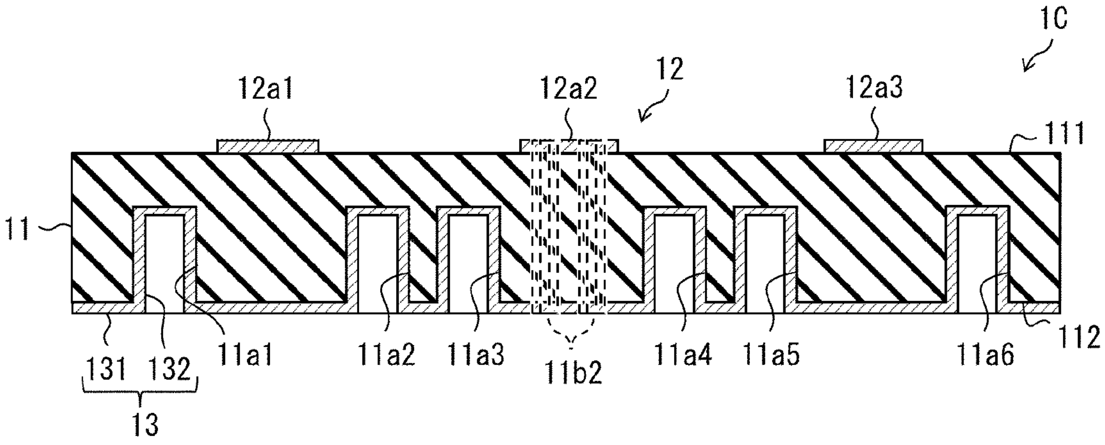

FIGS. 3 and 4 of Patent Literature 1 disclose, as a conventional example, a microstrip filter device (in Patent Literature 1, a resonant circuit device) including: a substrate made of a dielectric (in Patent Literature 1, a dielectric substrate 1); strip-shaped conductors which are provided to a first main surface of the substrate and adjacent ones of which are electromagnetically coupled to each other (in Patent Literature 1, resonant conductors 3 to 7); and a ground conductor layer provided to a second main surface of the substrate (in Patent Literature 1, a ground conductor 2). Note that each of the strip-shaped conductors functions as a resonator.

CITATION LIST

Patent Literature

Patent Literature 1
Japanese Patent Application Publication, Tokukaihei, No. 9-139605 (1997)

SUMMARY OF THE INVENTION

Technical Problem

Figure 1:
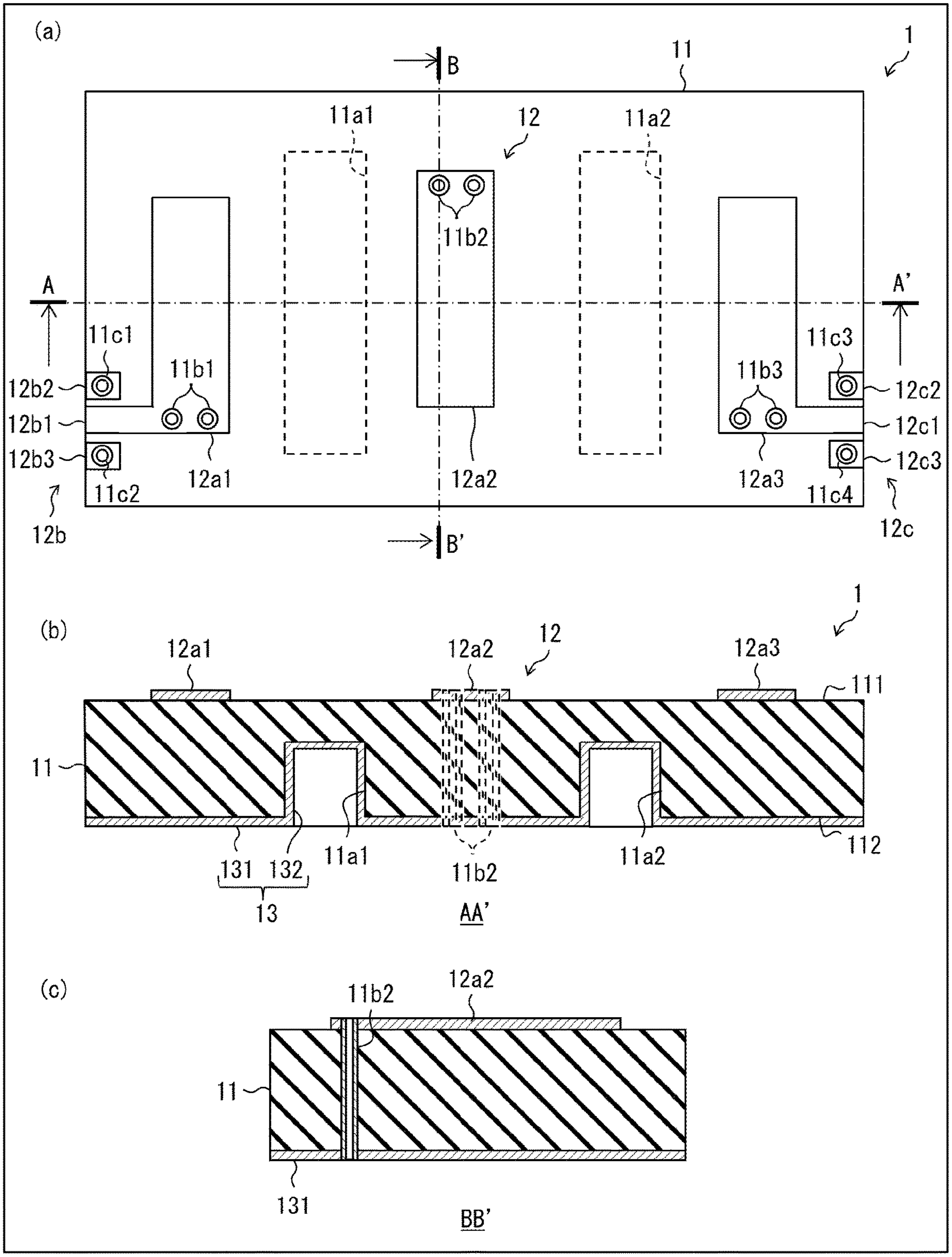

In addition, FIG. 1 of Patent Literature 1 illustrates the filter device including recessed portions (in FIG. 1 of Patent Literature 1, trenches 11) that are provided in areas of the substrate which areas do not overlap the strip-shaped conductors (in FIG. 1 of Patent Literature 1, resonant conductors 5 and 6) in plan view and that are opened in the first main surface. With this configuration, since a specific inductive capacity of air filled in the recessed portions is smaller than a specific inductive capacity of the dielectric constituting the substrate, it is possible to reduce a degree of electromagnetic coupling between adjacent ones of the strip-shaped conductors. Thus, if the filter device is designed such that the degree of coupling between the adjacent ones of the strip-shaped conductors is substantially the same as those in conventional ones, a distance between the adjacent ones of the strip-shaped conductors can be reduced. Therefore, the filter device can be reduced in size. Such a filter device, however, is required to be further reduced in size.

An aspect of the present invention was made in consideration of the above-described problem, and has an object to reduce a filter device in size as compared to conventional ones.

Solution to the Problem

A filter device in accordance with a first aspect of the present invention includes: a substrate which is made of a dielectric and which includes a first main surface and a second main surface facing each other; strip-shaped conductors which are provided to the first main surface and adjacent ones of which are electromagnetically coupled to each other; and a ground conductor layer provided at least to the second main surface, wherein an area of the first main surface which area is interposed between adjacent ones of the strip-shaped conductors is designated as an intermediate area, and an area of the second main surface which area faces the intermediate area has one or more first recessed portions having a surface covered with the ground conductor layer.

Advantageous Effects of the Invention

A filter device in accordance with an aspect of the present invention can be reduced in size.

BRIEF DESCRIPTION OF THE DRAWINGS (a) of FIG. 1 is a plan view of a filter device in accordance with Embodiment 1 of the present invention. (b) and (c) of FIG. 1 are cross-section views of the filter device shown in (a) of FIG. 1.

Figure 2:
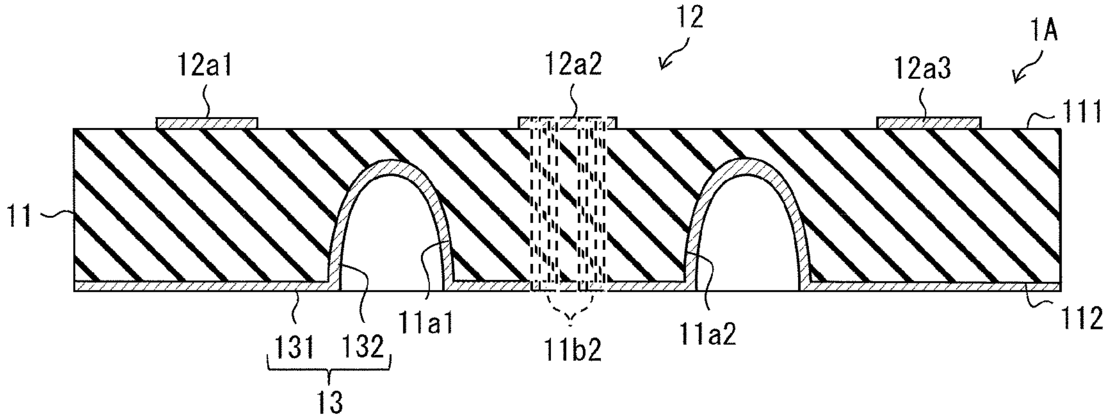

FIG. 2 is a cross-section view of Variation 1 of the filter device shown in FIG. 1.

(a) and (b) of FIG. 3 are respectively a plan view and a cross-section view of Variation 2 of the filter device shown in FIG. 1.

FIG. 4 is a cross-section view of Variation 3 of the filter device shown in FIG. 1.

Figure 5:
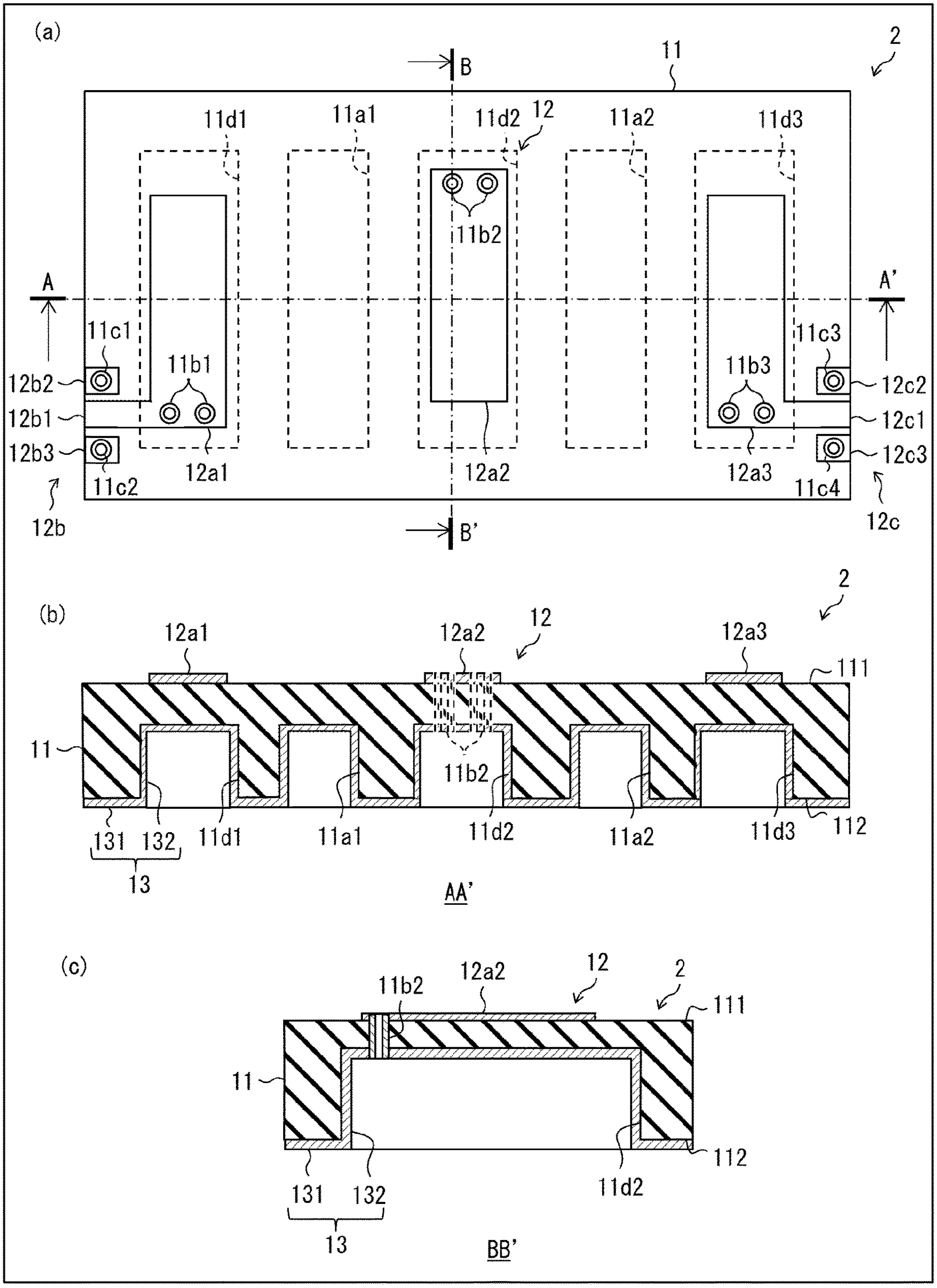

(a) of FIG. 5 is a plan view of a filter device in accordance with Embodiment 2 of the present invention. (b) and (c) of FIG. 5 are cross-section views of the filter device shown in (a) of FIG. 5.

Figure 6:
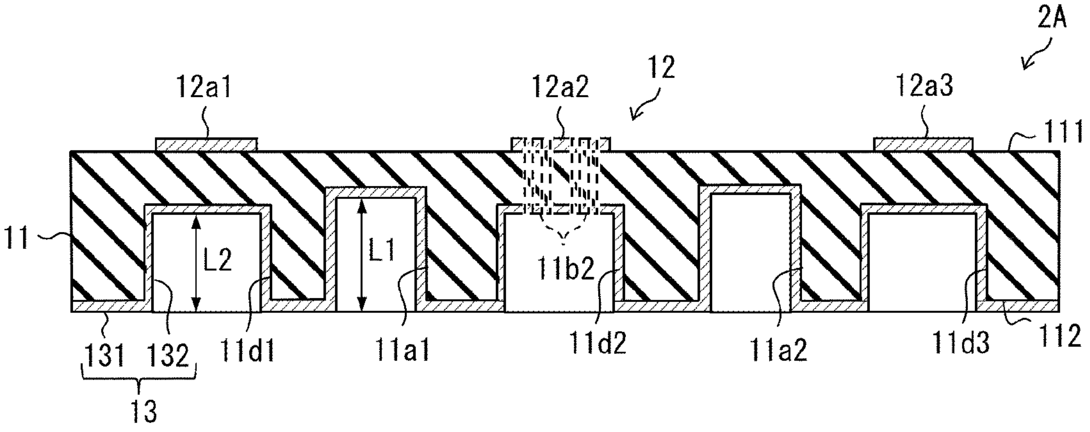

FIG. 6 is a cross-section view of Variation 1 of the filter device shown in FIG. 5.

Figure 7:
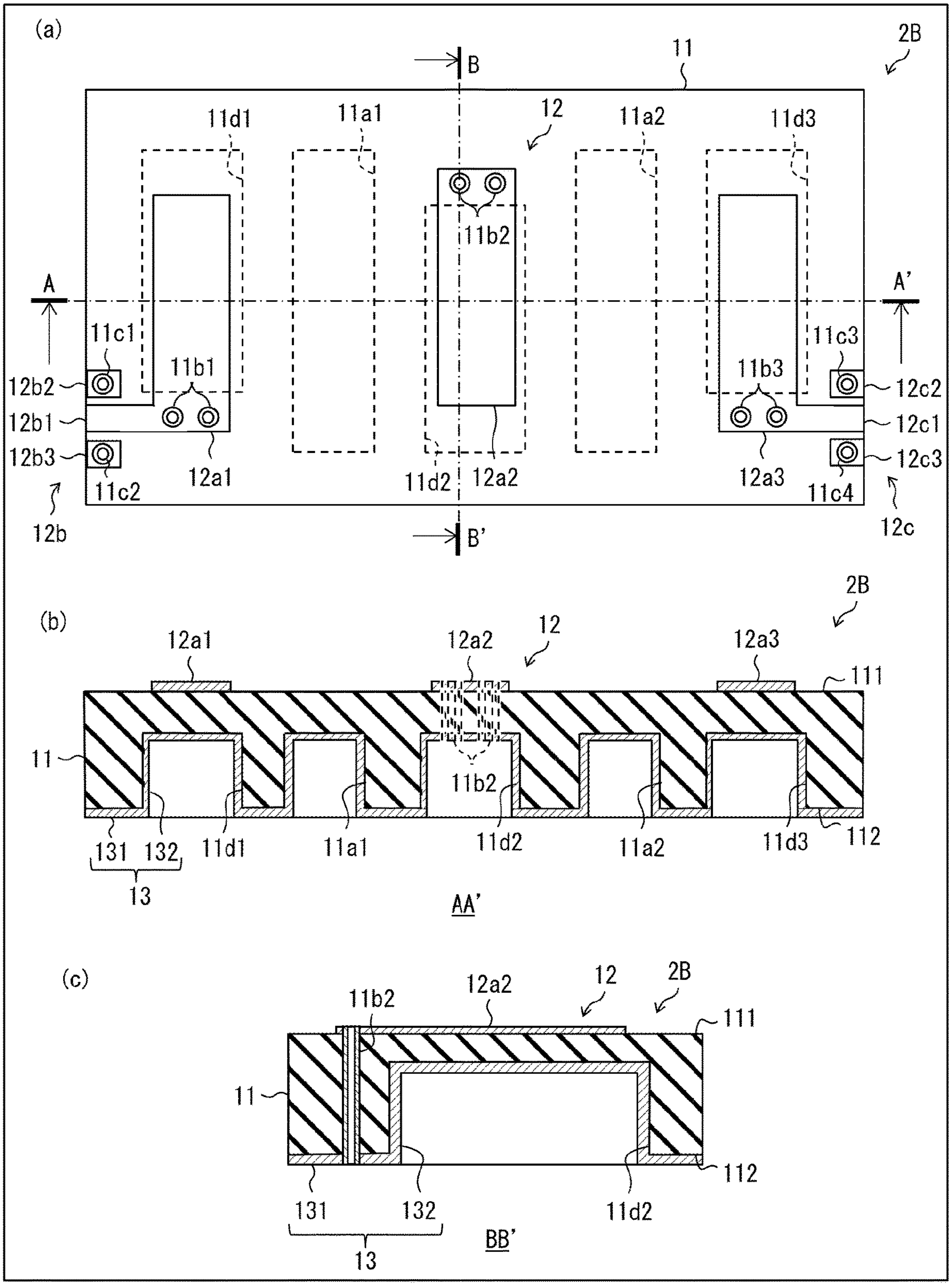

(a) of FIG. 7 is a plan view of Variation 2 of the filter device shown in FIG. 5. (b) and (c) of FIG. 7 are cross-section views of the filter device shown in (a) of FIG. 7.

Figure 8:
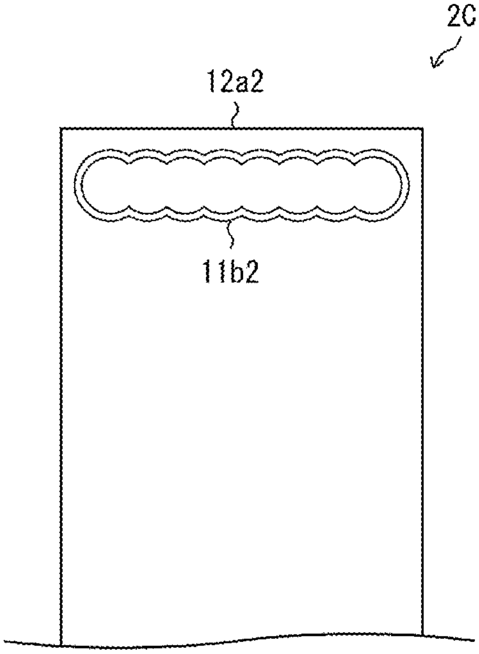

FIG. 8 is an enlarged plan view of one end portion of a strip-shaped conductor included in a variation of the filter device shown in FIG. 7.

Figure 9:
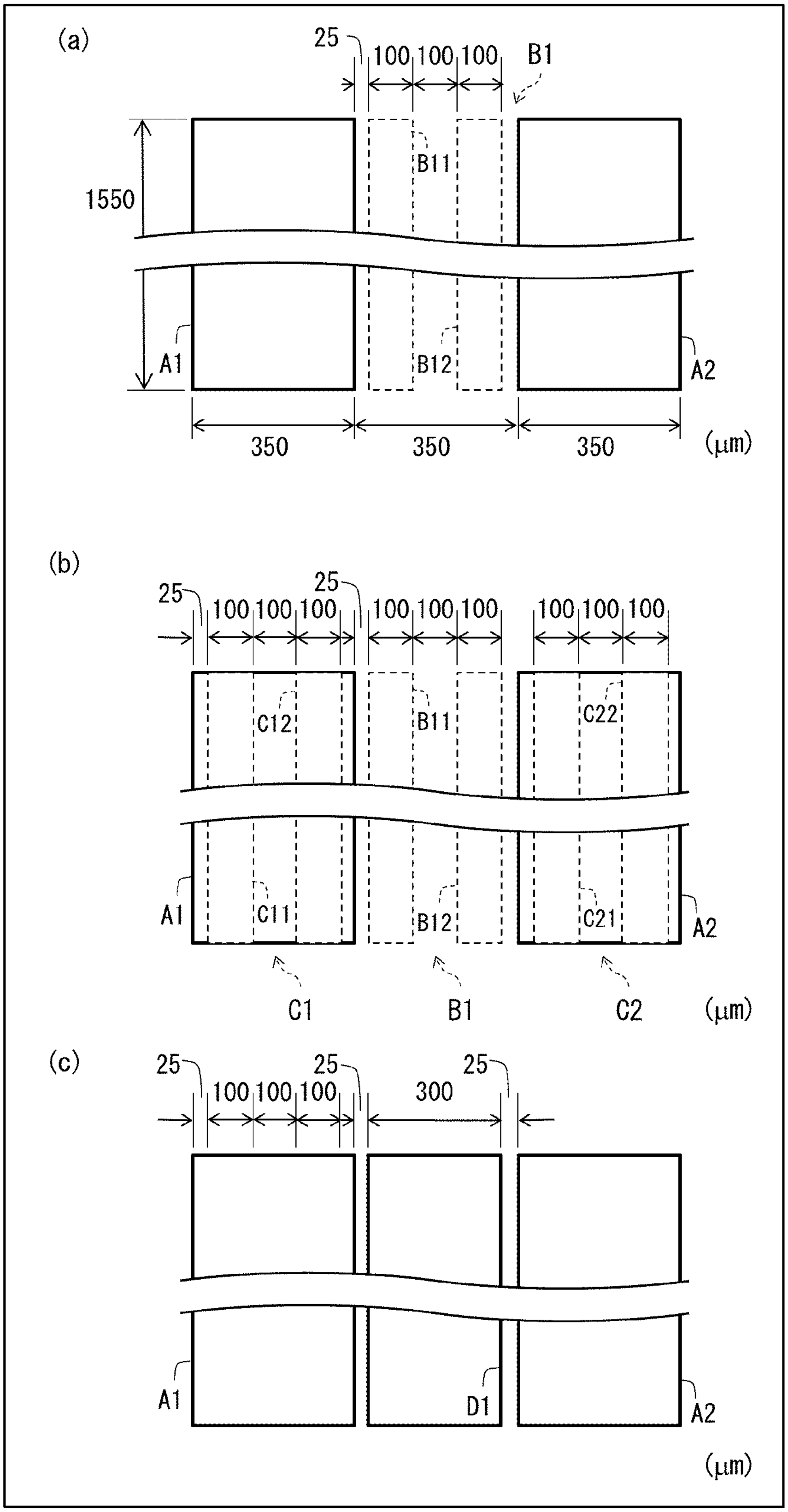

(a) of FIG. 9 is a plan view illustrating a structure of Example 1 of the present invention, (b) of FIG. 9 is a plan view illustrating a structure of Example 2 of the present invention, and (c) of FIG. 9 is a plan view illustrating a structure of Comparative Example 2.

Figure 10:
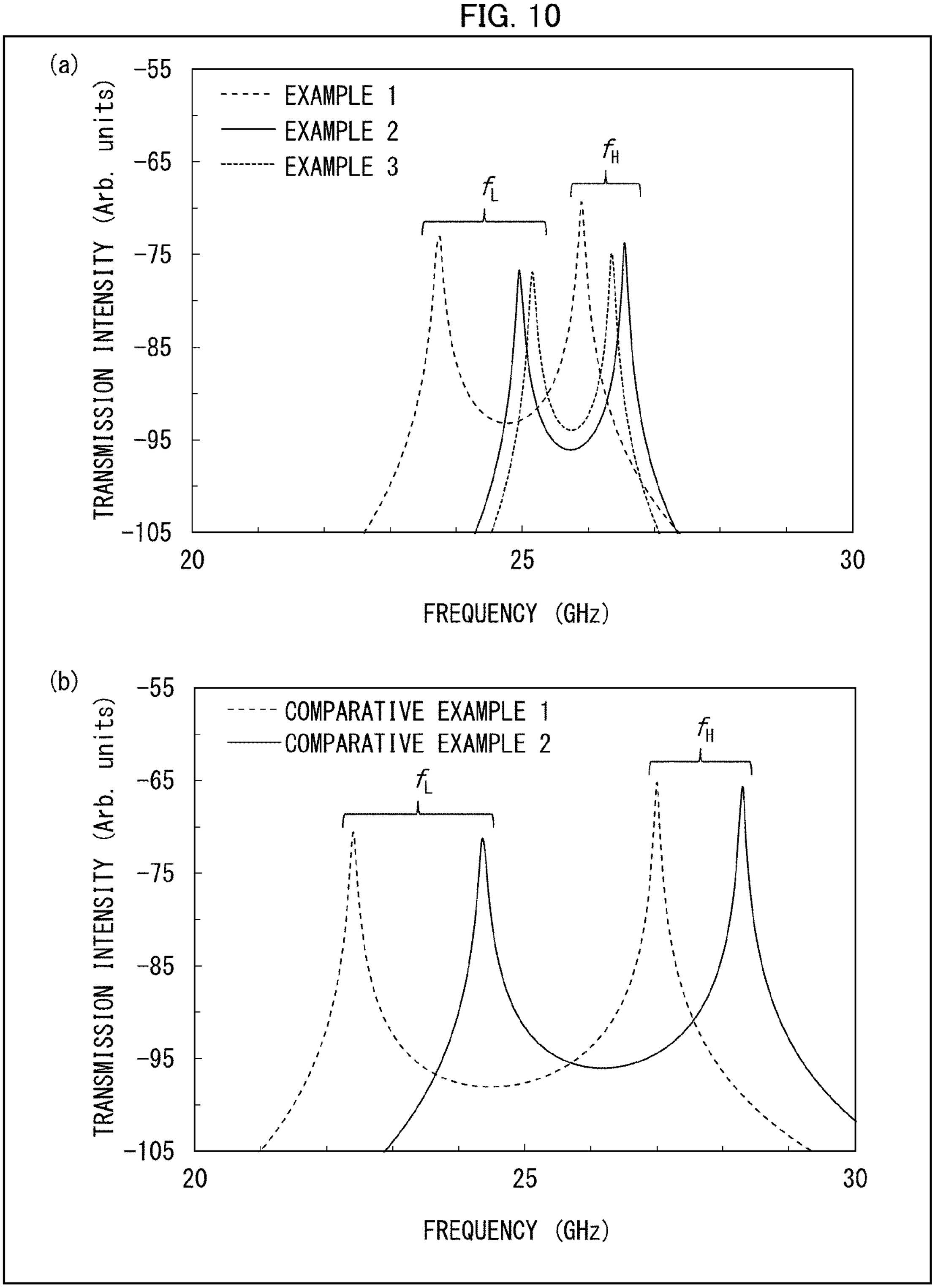

(a) of FIG. 10 shows a graph illustrating transmission properties of structures of Examples 1 to 3 of the present invention, and (b) of FIG. 10 shows a graph illustrating transmission properties of structures of Comparative Examples 1 and 2.

DETAILED DESCRIPTION OF THE EMBODIMENTS

A filter device in accordance with an embodiment of the present invention functions as a bandpass filter that allows passage of, of high frequency signals having a frequency within a frequency band which is called a millimeter wave or a microwave, a high frequency signal within a given pass band and that blocks the other high frequency signals. The description of the later-described Embodiment 1 and Embodiment 2 will be given based on an assumption that a center frequency of the pass band is included in a 25-GHz band. However, the center frequency and the bandwidth of the pass band are not limited to any particular ones, and may be designed as appropriate according to the purpose of use of the filter device.

Embodiment 1

The following description will discuss, with reference to FIG. 1, a filter device in accordance with Embodiment 1 of the present invention. (a) of FIG. 1 is a plan view of the filter device 1. (b) and (c) of FIG. 1 are cross-section views of the filter device 1. (b) of FIG. 1 is a cross-section view illustrating a cross section taken along A-A' line shown in (a) of FIG. 1, and (c) of FIG. 1 is a cross-section view illustrating a cross section taken along B-B' line shown in (a) of FIG. 1.

<Configuration of Filter Device>

As shown in (a) to (c) of FIG. 1, the filter device 1 includes a substrate 11, a conductor pattern 12, and a ground conductor layer 13.

(Substrate)

The substrate 11 is a plate-like member which is made of a dielectric and which includes a main surface 111 and a main surface 112 facing each other. The main surface 111 is an example of the first main surface recited in the claims. The main surface 112 is an example of the second main surface recited in the claims.

In Embodiment 1, the substrate 11 is made of quartz. However, the dielectric constituting the substrate 11 is not limited to quartz, but can be selected as appropriate. Examples of the dielectric encompass glass other than quartz, ceramic, semiconductors such as silicon and GaAs, and resins.

In Embodiment 1, the substrate 11 has a rectangular shape when the main surface 111 is seen along a line normal to the main surface 111. However, the shape of the substrate 11 is not limited to the rectangular shape, but can be selected as appropriate. In the description below, the expression "seeing in plan view" refers to seeing the main surface 111 along a line normal to the main surface 111.

In Embodiment 1, the main surface 111 is provided with the later-described conductor pattern 12, and the main surface 112 is provided with the recessed portions 11*a*1 and 11*a*2 and the ground conductor layer 13 (described later). Alternatively, the conductor pattern 12 may be indirectly provided to the main surface 111 of the substrate 11, and the ground conductor layer 13 may be indirectly provided to the main surface 112 of the substrate 11. For example, another layer having a low conductivity (e.g., a dielectric layer) may be interposed (i) between the main surface 111 and the conductor pattern 12 and/or (ii) between the main surface 112 and the ground conductor layer 13. The substrate 11 includes, in its inside, the later-described conductor posts 11*b*1 to 11*b*3.

(Conductor Pattern)

The conductor pattern 12 provided to the main surface 111 can be obtained by patterning of a conductor film into a given shape. In Embodiment 1, the conductor pattern 12 is made of copper. However, the conductor constituting the conductor pattern 12 is not limited to copper, but can be selected as appropriate. The conductor pattern 12 includes strip-shaped conductors 12*a*1 to 12*a*3, a coplanar line 12*b*, and a coplanar line 12*c*. In Embodiment 1, the conductor pattern 12 is constituted by three strip-shaped conductors 12*a*1 to 12*a*3. However, the number of strip-shaped conductors constituting the conductor pattern 12 is not limited to three. The number of the strip-shaped conductors constituting the conductor pattern 12 only needs to be at least more than one. Instead of three strip-shaped conductors, five strip-shaped conductors may be used to constitute the conductor pattern 12, for example.

As shown in (a) of FIG. 1, each of the strip-shaped conductors 12*a*1 to 12*a*3 has a rectangular shape. Hereinafter, a direction in which the strip-shaped conductors 12*ai* (i is an integer of not less than one and not more than three) extend (i.e., a direction extending along longer sides of the strip-shaped conductors 12*ai*) will be referred to as a lengthwise direction. Meanwhile, a direction crossing the lengthwise direction (i.e., a direction extending along shorter sides of the strip-shaped conductors 12*ai*) will be referred to as a width direction. In each strip-shaped conductor 12*ai*, a length measured in the lengthwise direction will be referred to as a length, whereas a length measured in the width direction will be referred to as a width.

The strip-shaped conductors 12*ai* are arranged such that their longer sides are in parallel with each other. Further, the strip-shaped conductors 12*ai* are arranged such that a distance between adjacent ones of the strip-shaped conductors has a certain value. Each of the strip-shaped conductors 12*ai* arranged in this manner is electromagnetically coupled to another one of the strip-shaped conductors 12*ai* adjacent to the each of the strip-shaped conductors 12*ai*. A distance between adjacent ones of the strip-shaped conductors is adjusted as appropriate so that a degree of coupling between adjacent ones of the strip-shaped conductors attains a desired value.

When seen along the lengthwise direction of each strip-shaped conductor 12*ai*, a length of each strip-shaped conductor 12*ai* can be defined as appropriate in accordance with a center frequency of a pass band and a specific inductive capacity of the substrate 11. In Embodiment 1, the length of each strip-shaped conductor 12*ai* is defined to be a quarter of an effective wavelength of an electromagnetic wave whose frequency is equal to the center frequency. However, the length of each strip-shaped conductor 12*ai* is not limited to the quarter of the effective wavelength, and may alternatively be an integral multiple of the quarter.

The coplanar line 12*b* is made of a signal line 12*b*1 and ground conductor patterns 12*b*2 and 12*b*3. One end portion of the signal line 12*b*1 is electrically connected to one end portion of the strip-shaped conductor 12*a*1. The ground conductor patterns 12*b*2 and 12*b*3 are disposed such that the signal line 12*b*1 is sandwiched therebetween. The coplanar line 12*b* functions as an input-output port of the filter device 1.

The coplanar line 12*c* is made of a signal line 12*c*1 and ground conductor patterns 12*c*2 and 12*c*3. One end portion of the signal line 12*c*1 is electrically connected to one end portion of the strip-shaped conductor 12*a*3. The ground conductor patterns 12*c*2 and 12*c*3 are disposed such that the signal line 12*c*1 is sandwiched therebetween. The coplanar line 12*c* functions as an input-output port of the filter device 1.

(Recessed Portion)

The main surface 111 has areas each of which is interposed between adjacent ones of the strip-shaped conductors, and such an area will be referred to as an intermediate area. As shown in (a) of FIG. 1, the filter device 1 includes the three strip-shaped conductors 12*a*1 to 12*a*3. Thus, the filter device 1 includes intermediate areas, one of which resides between the strip-shaped conductors 12*a*1 and 12*a*2 and the other of which resides between the strip-shaped conductors 12*a*2 and 12*a*3. The recessed portions 11*a*1 and 11*a*2 are recessed portions provided in areas of the main surface 112 which areas respectively face the intermediate areas. Each of the recessed portions 11*a*1 and 11*a*2 is an example of the first recessed portion. The recessed portions 11*a*1 and 11*a*2 provided in this manner are arranged such that, in plan view, the recessed portion 11*a*1 is interposed between the strip-shaped conductors 12*a*1 and 12*a*2 adjacent to each other and the recessed portion 11_a_2 is interposed between the strip-shaped conductors 12_a_2 and 12_a_3 adjacent to each other (see (a) of FIG. 1).

Each recessed portion 11_aj_ (j is one or two) has a bottom surface and a side surface constituting a surface of the each recessed portion 11_aj_, and the bottom surface and side surface of the each recessed portion 11_aj_ are covered with the later-described second ground conductor layer 132 (see (b) of FIG. 1).

In Embodiment 1, when seen along the lengthwise direction in which each strip-shaped conductor 12_ai_ extends, two end portions of each recessed portion 11_aj_ protrude more than two end portions of each of two strip-shaped conductors 12_ai_ adjacent to the each recessed portion aj. For example, when seen along the lengthwise direction, two end portions of the recessed portion 11_a_1 protrude more than two end portions of the strip-shaped conductor 12_a_1 and two end portions of the strip-shaped conductor 12_a_2. Alternatively, the length of each recessed portion 11_aj_ may be either equal to or shorter than the length of each strip-shaped conductor 12_ai_. When seen along the lengthwise direction, each recessed portion 11_aj_ only needs to at least partially overlap at least parts of strip-shaped conductors 12_ai_ adjacent to the each recessed portion 11_aj_.

In Embodiment 1, each recessed portion 11_aj_ has a rectangular parallelepiped shape. However, the shape of each recessed portion 11_aj_ is not limited to the rectangular parallelepiped shape, but can be selected as appropriate.

In Embodiment 1, a width of each recessed portion 11_aj_ is substantially equal to a width of each strip-shaped conductor 12_ai_. Alternatively, the width of each recessed portion 11_aj_ may be smaller than or equal to the width of each strip-shaped conductor 12_ai_.

The recessed portions 11_aj_ form an air layer. Therefore, lines of electric force are more difficult to pass through the recessed portions 11_aj_ than through the substrate 11, which is made of a dielectric. As a result of provision of the recessed portions 11_aj_, the substrate 11 is reduced in thickness at portions corresponding to the recessed portions 11_aj_. Consequently, lines of electric force existing between the strip-shaped conductors 12_ai_ sandwiching each recessed portion 11_aj_ are reduced. That is, the degree of coupling between the strip-shaped conductors 12_ai_ sandwiching each recessed portion 11_aj_ (i.e., a coupling coefficient between the resonators) is reduced. Thus, if the filter device is designed such that the degree of coupling between the adjacent ones of the strip-shaped conductors is substantially the same as those in conventional ones, a distance between the adjacent ones of the strip-shaped conductors can be reduced. That is, the filter device 1 can be reduced in size.

Note that each recessed portion 11_aj_ has a width and a depth to its bottom surface that are adjusted as appropriate to give a desired degree of coupling between the strip-shaped conductors 12_ai_ adjacent to the each recessed portion 11_aj_.

(Ground Conductor Layer)

The ground conductor layer 13 is provided at least to the main surface 112. Specifically, as shown in (b) of FIG. 1, the ground conductor layer 13 is constituted by the first ground conductor layer 131 and the second ground conductor layer 132. The first ground conductor layer 131 refers to a portion of the ground conductor layer 13 which portion is provided to the main surface 112, whereas the second ground conductor layer 132 refers to a portion of the ground conductor layer 13 which portion covers a surface of each recessed portion 11_aj_.

The ground conductor layer 13 is made of a conductor film. In Embodiment 1, the ground conductor layer 13 is made of copper. However, the conductor constituting the ground conductor layer 13 is not limited to copper, but can be selected as appropriate.

As shown in (b) of FIG. 1, the first ground conductor layer 131 and the second ground conductor layer 132 are formed so as to be continuous to each other, and are electrically connected to each other. Thus, a potential of the first ground conductor layer 131 and a potential of the second ground conductor layer 132 are identical to each other.

(Conductor Post)

The conductor posts 11_b_1 to 11_b_3 respectively correspond to the strip-shaped conductors 12_a_1 to 12_a_3. Each conductor post 11_bi_ corresponding to its respective strip-shaped conductor 12_ai_ (i is an integer of not less than one and not more than three) is disposed in an area overlapping one end portion of the respective strip-shaped conductor 12_ai_ when the main surface 111 is seen in plan view (see (a) of FIG. 1), and short-circuits the respective strip-shaped conductor 12_ai_ and the first ground conductor layer 131 (see the conductor post 11_b_2 shown in (c) of FIG. 1).

Each conductor post 11_bi_ can be obtained by forming a conductor film on an inner wall of a through-hole provided in an area of the substrate 11 which area corresponds to the one end portion of the respective strip-shaped conductor 12_ai_. Alternatively, each conductor post 11_bi_ may be made of a conductor filled in the through-hole.

When seen in plan view, conductor posts 11_c_1, 11_c_2, 11_c_3, and 11_c_4 are respectively disposed in areas overlapping the ground conductor patterns 12_b_2, 12_b_3, 12_c_2, and 12_c_3. The conductor posts 11_c_1, 11_c_2, 11_c_3, and 11_c_4 respectively short-circuit the ground conductor patterns 12_b_2, 12_b_3, 12_c_2, and 12_c_3 to the first ground conductor layer 131.

Note that, in the filter device 1, each conductor post 11_bi_ is constituted by two conductor posts. However, there is no limitation on the number of conductor posts constituting each conductor post 11_bi_, and the number of conductor posts constituting each conductor post 11_bi_ may be one or three or more. A cross-sectional shape of the conductor post(s) constituting each conductor post 11_bi_ is not limited to a circle.

The filter device 1 configured as above can be reduced in size, as compared to filter devices in accordance with conventional techniques that have the same degree of coupling.

<Variation 1>

Next, the following description will discuss, with reference to FIG. 2, a filter device 1A, which is Variation 1 of the filter device 1 shown in FIG. 1. FIG. 2 is a cross-section view of the filter device 1A, and this cross-section view corresponds to the cross-section view of the filter device 1 shown in (b) of FIG. 1. Note that, for convenience, members of the filter device 1A having functions identical to those of the respective members described for the filter device 1 are given respective identical reference numerals, and a description of those members is omitted here. This also applies to the later-described variations.

The filter device 1A can be obtained by modifying the filter device 1 such that the shape of each recessed portion 11_aj_ is changed from a rectangular parallelepiped shape to a half-pipe shape. The "half-pipe shape" herein refers to a shape obtained by cutting, along a center axis of the pipe and along a shorter axis of the ellipse, a pipe having an ellipse cross section into two.

In the filter device 1, each recessed portion 11*aj* has a rectangular parallelepiped shape. Therefore, a non-continuous angle is formed at a boundary between the bottom surface and the side surface of each recessed portion 11*aj* (see (b) of FIG. 1). Alternatively, the bottom surface and the side surface of each recessed portion 11*aj* may be smoothly connected to each other, as in the filter device 1A in accordance with Variation 1. Further alternatively, another variation of the filter device 1A can be obtained by modifying the filter device 1 such that each recessed portion 11*aj*, which has a rectangular parallelepiped shape, is transformed into a shape having a circular-arc (e.g., a half-circle) bottom surface.

Variation 1 can also bring about similar effects given by Embodiment 1. Furthermore, in a case where the recessed portions 11*aj* having a half-pipe shape are employed as in Variation 1, it is possible to bring about another effect of facilitating forming of a second ground conductor layer 132 having a uniform thickness in the recessed portions 11*aj*, as compared to a case where the recessed portions 11*aj* having a rectangular parallelepiped shape are employed.

<Variation 2>

Next, the following description will discuss, with reference to FIG. 3, a filter device 1B, which is Variation 2 of the filter device 1 shown in FIG. 1. (a) of FIG. 3 is a plan view of the filter device 1B. (b) of FIG. 3 is an A-A' cross-section view of the filter device 1B, and this cross-section view corresponds to the cross-section view of the filter device 1 shown in (b) of FIG. 1.

The filter device 1B can be obtained by modifying the filter device 1 such that the shape of each recessed portion 11*aj* is changed from a single rectangular parallelepiped shape to a plurality of rectangular parallelepiped shapes each having a narrower width. Thus, the description in Variation 2 will discuss the shape of a single recessed portion 11*aj*.

As shown in FIG. 3, each recessed portion 11*aj* of the filter device 1B is constituted by a left recessed portion 11*aj*1, a center recessed portion 11*aj*2, and a right recessed portion 11*aj*3. Note that the terms "left", "center", and "right" herein are used merely to distinguish the three recessed portions constituting the single recessed portion 11*aj* from each other, and do not have any other meanings.

Each of the left recessed portion 11*aj*1, the center recessed portion 11*aj*2, and the right recessed portion 11*aj*3 has a rectangular parallelepiped shape, similarly to each recessed portion 11*aj* in the filter device 1. Note that each of the left recessed portion 11*aj*1, the center recessed portion 11*aj*2, and the right recessed portion 11*aj*3 has a width that is an approximately one-fifth of the width of each recessed portion 11*aj* in the filter device 1. In addition, the left recessed portion 11*aj*1, the center recessed portion 11*aj*2, and the right recessed portion 11*aj*3 are arranged at equal intervals. Note that the width of each recessed portion 11*aj* in the filter device 1B is equal to the width of each recessed portion 11*aj* in the filter device 1.

Variation 2 can also bring about similar effects given by Embodiment 1. Furthermore, in a case where the recessed portions 11*aj* each constituted by a plurality of divided recessed portions are employed as in Variation 2, it is possible to bring about another effect of facilitating manufacturing of recessed portions, as compared to a case in which the recessed portions each constituted by a single recessed portion are employed. In addition, providing a plurality of small-width recessed portions can bring about further another effect of enhancing the strength of the substrate 11, as compared to the filter device 1. Note that the feature of the foregoing Variation 1 can also be applied to Variation 2. With this, Variation 2 can additionally bring about the effects of Variation 1.

<Variation 3>

Next, the following description will discuss, with reference to FIG. 4, a filter device 1C, which is Variation 3 of the filter device 1 shown in FIG. 1. FIG. 4 is a cross-section view of the filter device 1C, and this cross-section view corresponds to the cross-section view of the filter device 1 shown in (b) of FIG. 1.

As shown in FIG. 4, the filter device 1C is configured such that recessed portions 11*aj* are disposed on both sides of each of strip-shaped conductors 12*ai* in plan view. Specifically, in plan view, a recessed portion 11*a*1 and a recessed portion 11*a*2 are disposed on both sides of a strip-shaped conductor 12*a*1. Moreover, a recessed portion 11*a*3 and a recessed portion 11*a*4 are disposed on both sides of a strip-shaped conductor 12*a*2. Furthermore, a recessed portion 11*a*5 and a recessed portion 11*a*6 are disposed on both sides of a strip-shaped conductor 12*a*3.

Note that, for example, a total width of two recessed portions 11*aj* interposed between two strip-shaped conductors 12*ai* is substantially equal to the width of the single recessed portion 11*aj* in the filter device 1.

Variation 3 can also bring about similar effects given by Embodiment 1. Note that the foregoing Variation 1 can also be applied to Variation 3. With this, Variation 3 can additionally bring about the effects of Variation 1. In addition, the filter device 1C can be expected to achieve the effect of size reduction from the viewpoint of control of impedance, as compared to a configuration without a recessed portion 11*aj*. This is because that, when the impedances of the strip-shaped conductors 12*ai* are caused to match each other, the width of each strip-shaped conductor 12*ai* in the filter device 1C can be made narrower than that in the configuration without the recessed portion 11*aj*.

Embodiment 2

Next, the following description will discuss, with reference to FIG. 5, a filter device 2 in accordance with Embodiment 2 of the present invention. Note that, for convenience, members having functions identical to those of the respective members described for the above-described embodiments are given respective identical reference numerals, and a description of those members is omitted here. (a) of FIG. 5 is a plan view of the filter device 2. (b) and (c) of FIG. 5 are cross-section views of the filter device 2. (b) of FIG. 5 is a cross-section view illustrating a cross section taken along A-A' line shown in (a) of FIG. 5, and (c) of FIG. 5 is a cross-section view illustrating a cross section taken along B-B' line shown in (a) of FIG. 5. In other words, the filter device 2 is a variation of the filter device 1 shown in FIG. 1. Thus, for convenience, members of the filter device 2 having functions identical to those of the respective members described for the filter device 1 are given respective identical reference numerals, and a description of those members is omitted here. This also applies to the later-described variations.

(Additional Recessed Portion)

As shown in FIG. 5, the filter device 2 can be obtained by modifying the filter device 1 so that the main surface 112 has not only the recessed portions 11*a*1 and 11*a*2 but also recessed portions 11*d*1 to 11*d*3. Each of the recessed portions 11*d*1 to 11*d*3 is an example of the second recessed portion.

The recessed portions 11*d*1 to 11*d*3 provided to the main surface 112 respectively correspond to strip-shaped conductors 12*a*1 to 12*a*3 facing the recessed portions 11*d*1 to 11*d*3. Each recessed portion 11*di* corresponding to its respective strip-shaped conductor 12*ai* is disposed so as to overlap the respective strip-shaped conductor 12*ai* when the main surface 111 is seen in plan view (see (a) of FIG. 5). In Embodiment 2, each recessed portion 11*di* is disposed so as to cover its respective strip-shaped conductor 12*ai*. Note that each recessed portion 11*di* only needs to at least partially overlap at least a part of its respective strip-shaped conductor 12*ai*.

A depth of each recessed portion 11*di* is substantially equal to the depth of each recessed portion 11*aj*. Similarly to each recessed portion 11*aj*, each recessed portion 11*di* has a bottom surface and a side surface constituting a surface of the each recessed portion 11*di*, and the bottom surface and side surface of the each recessed portion 11*di* are covered with a second ground conductor layer 132 (see (b) of FIG. 5).

In Embodiment 2, each recessed portion 11*di* has a rectangular parallelepiped shape. However, the shape of each recessed portion 11*di* is not limited to the rectangular parallelepiped shape, but can be selected as appropriate.

In Embodiment 2, a width of each recessed portion 11*di* is greater than a width of a strip-shaped conductor 12*ai* corresponding to the recessed portion 11*di*. Alternatively, the width of each recessed portion 11*di* may be either smaller than or equal to the width of each strip-shaped conductor 12*ai*.

Note that a distance between each strip-shaped conductor 12*ai* and a bottom surface of its respective recessed portion 11*di* is adjusted as appropriate to give a desired degree of coupling between the each strip-shaped conductor 12*ai* and a portion of the second ground conductor layer 132 which portion is provided to the bottom surface of the respective recessed portion 11*di*.

In Embodiment 2, when seen along a lengthwise direction in which each strip-shaped conductor 12*ai* extends, a length of each recessed portion 11*di* is longer than a length of its respective strip-shaped conductor 12*ai* overlapping, in plan view, the each recessed portion 11*di* (see (c) of FIG. 5). When seen along the lengthwise direction of each strip-shaped conductor 12*ai*, each recessed portion 11*di* covers the strip-shaped conductor 12*ai* that overlaps the each recessed portion 11*di* (see (c) of FIG. 5). Alternatively, the length of each recessed portion 11*di* may be either equal to or shorter than the length of the strip-shaped conductor 12*ai* overlapping the each recessed portion 11*di*. Note that each recessed portion 11*di* only needs to at least partially overlap, in plan view, at least a part of its respective strip-shaped conductor 12*ai* corresponding to the each recessed portion 11*di*.

(Conductor Post)

In Embodiment 2, the conductor posts 11*b*1 to 11*b*3 respectively correspond to the strip-shaped conductors 12*a*1 to 12*a*3. Each conductor post 11*bi* corresponding to its respective strip-shaped conductor 12*ai* is disposed in an area (in Embodiment 2, one end portion) in which the respective strip-shaped conductor 12*ai* and its respective recessed portion 11*di* overlap each other when the main surface 111 is seen in plan view (see (a) of FIG. 5), and short-circuits the respective strip-shaped conductor 12*ai* and the second ground conductor layer 132 (see the conductor post 11*b*2 shown in (c) of FIG. 5). A distance between (i) a portion of the bottom surface of each recessed portion 11*di* which portion includes one or more conductor posts 11*bi* and (ii) the main surface 111 is constant.

In Embodiment 2, when the main surface 111 is seen in plan view, each recessed portion 11*di* covers it respective strip-shaped conductor 12*ai*. Thus, when seen in plan view, each conductor post 11*bi* is positioned inside its respective recessed portion 11*di*. However, the position where each conductor post 11*bi* is provided is not limited to the position inside its respective recessed portion 11*di*, and may alternatively be a position outside its respective recessed portion 11*di* (i.e., the first ground conductor layer) or a position on an outer periphery (i.e., a side surface) of its respective recessed portion 11*di*.

Embodiment 2 includes, in addition to the recessed portions 11*a*1 and 11*a*2, the recessed portions 11*d*1 to 11*d*3. Provision of the recessed portions 11*d*1 to 11*d*3 reduces a distance between each strip-shaped conductor 12*ai* and a portion of the ground conductor layer 13 (second ground conductor layer 132) which portion is closest to the each strip-shaped conductors 12*ai*. Due to this, lines of electric force generated between the strip-shaped conductors 12*ai* and such portions of the ground conductor layer 13 are concentrated in a direction normal to the main surface 111 and are hardly expanded in an in-plane direction of the main surface 111. Consequently, coupling between adjacent ones of the strip-shaped conductors 12*ai* can be weakened. Thus, if the filter device 2 in accordance with Embodiment 2 is designed such that the degree of coupling between the adjacent ones of the strip-shaped conductors 12*ai* is substantially the same as those in conventional ones, the distance between the adjacent ones of the strip-shaped conductors 12*ai* can be made far narrower than in the filter device 1. That is, the filter device 2 can be further reduced in size.

Note that, in Embodiment 2, at least one of the recessed portions 11*a*1 and 11*a*2 and the recessed portions 11*d*1 to 11*d*3 can be combined with at least one of Variation 1 and Variation 2 of Embodiment 1. With this, Embodiment 2 can additionally bring about the effects of the variation(s).

<Variation 4>

Next, the following description will discuss, with reference to FIG. 6, a filter device 2A, which is Variation 1 of the filter device 2 shown in FIG. 5 (Variation 4 of the present invention). FIG. 6 is a cross-section view of the filter device 2A, and this cross-section view corresponds to the cross-section view of the filter device 2 shown in (b) of FIG. 5.

As shown in FIG. 6, the filter device 2A is configured such that a depth L1 of each recessed portions 11*aj* is greater (deeper) than a depth L2 of each recessed portion 11*di*. Specifically, as compared to the filter device 2, the filter device 2A has the recessed portions 11*aj* with a greater depth L1. With this, it is possible to further reduce the degree of coupling between adjacent ones of the strip-shaped conductors 12*ai*, as compared to the configuration in which the depth L1 of each recessed portion 11*aj* is equal to the depth L2 of each recessed portion 11*di*. Note that, also in Variation 4, at least one of the recessed portions 11*a*1 and 11*a*2 and the recessed portions 11*d*1 to 11*d*3 can be combined with at least one of Variation 1 and Variation 2.

<Variation 5>

Next, the following description will discuss, with reference to FIG. 7, a filter device 2B, which is Variation 2 of the filter device 2 shown in FIG. 5 (Variation 5 of the present invention). (a) of FIG. 7 is a plan view of the filter device 2B. (b) and (c) of FIG. 7 are cross-section views of the filter device 2B. (b) of FIG. 7 is a cross-section view illustrating a cross section taken along A-A' line shown in (a) of FIG. 7, and (c) of FIG. 7 is a cross-section view illustrating a cross section taken along B-B' line shown in (a) of FIG. 7.

(Recessed Portion)

The filter device 2B can be obtained by modifying the filter device 2 so as to reduce the lengths of the second recessed portions 11*d*1 to 11*d*3. Thus, in the filter device 2B, one end portion of each strip-shaped conductor 12*ai* protrudes from its respective second recessed portion 11*di* overlapping the each strip-shaped conductor 12*ai* in plan view (see (a) and (c) of FIG. 7).

When seen along a lengthwise direction of each strip-shaped conductor 12*ai* (see (c) of FIG. 7), a position where each second recessed portion 11*di* is to be provided is defined such that a distance between its respective conductor post 11*bi* and a portion of the second ground conductor layer 132 which portion is close to the respective conductor post 11*bi* is substantially equal to a distance between its respective strip-shaped conductor 12*ai* and the bottom surface of the each second recessed portion 11*di*. To be more specific, a position where each second recessed portion 11*di* is to be provided is defined such that a degree of coupling between its respective conductor post 11*bi* and the portion of the second ground conductor layer 132 which portion is close to the respective conductor post 11*bi* (i.e., a portion of the second ground conductor layer 132 which portion covers a portion of a side surface of the each second recessed portion 11*di* which portion is close to the respective conductor post 11*bi*) is substantially equal to a degree of coupling between the respective strip-shaped conductor 12*ai* and a portion of the second ground conductor layer 132 which portion is provided to a bottom surface of the each second recessed portion 11*di*.

(Conductor Post)

Similarly to the conductor posts 11*b*1 to 11*b*3 of the filter device 2, the conductor posts 11*b*1 to 11*b*3 of the filter device 2B respectively correspond to the strip-shaped conductors 12*a*1 to 12*a*3. When the main surface 111 is seen in plan view, each conductor post 11*bi* corresponding to its respective strip-shaped conductor 12*ai* is provided in an area where one end portion of the respective strip-shaped conductor 12*ai* which one end portion protrudes from its respective second recessed portion 11*di* overlaps the first ground conductor layer 131. Each conductor post 11*bi* short-circuits the one end portion and the first ground conductor layer 131. Each conductor post 11*bi* has a given degree of coupling with respect to a portion of the second ground conductor layer 132 which portion is close to the each conductor post 11*bi*. Thus, the each conductor post 11*bi* constitutes a two-conductor line, together with the portion of the second ground conductor layer 132.

As described above, in the filter device 2B, not only each strip-shaped conductor 12*ai* but also each conductor post 11*bi* functions as a signal line of the two-conductor line. Thus, a length of each strip-shaped conductor 12*ai* can be reduced by a thickness of the substrate 11 than the length of each strip-shaped conductor 12*ai* in the filter device 2.

In Variation 5, each conductor post 11*bi* is constituted by two conductor posts. However, there is no limitation on the number of conductor posts constituting each conductor post 11*bi*. In order to reduce a difference between a width of each strip-shaped conductor 12*ai* and an effective width of each conductor post 11*bi*, it is preferable to employ the following configuration. That is, (1) in a case where conductor posts constituting each conductor post 11*bi* are separated from each other, the sum of diameters of the conductor posts constituting the conductor post 11*bi* is close to the width of the strip-shaped conductor 12*ai*. Meanwhile, (2) in a case where conductor posts constituting each conductor post 11*bi* are integrated together, the width of the each conductor post 11*bi* (i.e., a length of each conductor post 11*bi* in the width direction of each strip-shaped conductor 12*ai*) is close to the width of the strip-shaped conductor 12*ai*.

<Variation 6>

The following description will discuss, with reference to FIG. 8, a filter device 2C, which is a variation of the filter device 2B shown in FIG. 7. FIG. 8 is an enlarged plan view of one end portion of a strip-shaped conductor 12*a*2, which is one of strip-shaped conductors included in the filter device 2C. Note that, for convenience, members of the filter device 2C having functions identical to those of the respective members described for the filter device 2B are given respective identical reference numerals, and a description of those members is omitted here.

The filter device 2C can be obtained by modifying the filter device 2B such that the shape of each conductor post 11*bi* is changed. FIG. 8 illustrates a conductor post 11*b*2 as an example of each conductor post 11*bi*. The other conductor posts 11*b*1 and 11*b*3 are identical in configuration to the conductor post 11*b*2.

Specifically, each conductor post 11*bi* in the filter device 2B is constituted by two conductor posts each having a circular cross-sectional shape. Meanwhile, each conductor post 11*bi* in the filter device 2C is constituted by eight conductor posts each of which has a circular cross-sectional shape and adjacent ones of which have a center-to-center distance shorter than a diameter of each conductor post. Thus, when seen along a width direction of each strip-shaped conductor 12*ai*, a width of each conductor post 11*bi* in the filter device 2C is substantially equal to a width of each strip-shaped conductor 12*ai*.

In Variation 6, the width of each conductor post 11*bi* is 92.5% of the width of each strip-shaped conductor 12*ai*. However, the width of each conductor post 11*bi* is not limited to this. In order to improve the degree of continuity between each strip-shaped conductor 12*ai* and its respective conductor post 11*bi*, the width of each conductor post 11*bi* is preferably in a range of not less than 80% and not more than 120% with respect to the width of each strip-shaped conductor 12*ai*.

EXAMPLES

The following description will discuss, with reference to FIGS. 9 and 10, Examples 1 to 3 of the present invention and Comparative Examples 1 and 2. (a) of FIG. 9 is a plan view illustrating a structure of Example 1 of the present invention, (b) of FIG. 9 is a plan view illustrating a structure of Example 2 of the present invention, and (c) of FIG. 9 is a plan view illustrating a structure of Comparative Example 2. (a) of FIG. 10 shows a graph illustrating frequency dependencies of transmission intensities of the structures of Examples 1 to 3 of the present invention, and (b) of FIG. 10 shows a graph illustrating frequency dependencies of transmission intensities of the structures of Comparative Examples 1 and 2. Hereinafter, the frequency dependency of the transmission intensity will be referred to as a transmission property.

Each of the structures of the Examples and Comparative Examples includes a substrate made of quartz glass, two strip-shaped conductors A1 and A2 provided to a first main surface, which is one main surface of the substrate, such that the two strip-shaped conductors A1 and A2 are in parallel with each other, and a ground conductor layer provided to a second main surface, which is the other main surface of the substrate.

The following description will discuss correspondence relations between (i) the structures of the Examples and Comparative Examples and (ii) the filter devices in accordance with the embodiments, on the basis of the structure of Example 1 shown in (a) of FIG. 9 and the filter device 1B in accordance with Variation 2 shown in FIG. 3. That is, the substrate, the strip-shaped conductors, and the ground conductor layer in the structure of Example 1 respectively correspond to the substrate 11, the strip-shaped conductors 12*ai* (i is either of two consecutive numbers selected from 1, 2, and 3), and the ground conductor layer 13 in the filter device 1B. Thus, it can be said that the structures of the Examples and Comparative Examples correspond to the structure of the filter device which includes the strip-shaped conductors and from which two strip-shaped conductors that are a minimum structure of strip-shaped conductors coupled to each other have been excluded. Note that (a) to (c) of FIG. 9 do not illustrate an outer periphery of the substrate and the ground conductor layer.

The Examples and Comparative Examples employed, as the substrate, quartz glass having a specific inductive capacity of 3.82 and a thickness of 400 μm, and included strip-shaped conductors A1 and A2 having a shape defined as follows (see (a) to (c) of FIG. 9). The shape of each of the strip-shaped conductors A1 and A2 was a rectangular shape having a width of 350 μm and a length of 1550 μm, and the strip-shaped conductors A1 and A2 were separated from each other by a distance of 350 μm. Note that the sizes of the strip-shaped conductors A1 and A2 are illustrated only in (a) of FIG. 9, and are not illustrated in (b) and (c) of FIG. 9, each of which shows configurations identical in size to the configuration shown in (a) of FIG. 9. Recessed portions in the Examples and Comparative Example 2 will be described later.

In the Examples and Comparative Examples, the structures configured as above were used as a calculation model to simulate a frequency dependency of a transmission intensity. The results are shown in FIG. 10.

It is known that, in two strip-shaped conductors electromagnetically coupled to each other as in the structures of the Examples and Comparative Examples, a coupling coefficient k between strip-shaped conductors adjacent to each other is expressed by the following formula (1). Note that each of the two strip-shaped conductors behaves as a resonator.

$$k = \frac{f_h^2 - f_l^2}{f_h^2 + f_l^2} \tag{1}$$

Here, the coupling coefficient k is an indicator indicating a degree of coupling between the resonators. A greater coupling coefficient k indicates a higher degree of coupling between the resonators. In formula (1), $f_h$ denotes a resonance frequency on a higher frequency side, and $f_l$ denotes a resonance frequency on a lower frequency side.

Example 1

As shown in (a) of FIG. 9, in the structure of Example 1, a recessed portion B1 was provided in an area of the second main surface of the substrate which area did not face the strip-shaped conductor A1 or A2 and which area was interposed between the strip-shaped conductors A1 and A2 adjacent to each other. The recessed portion B1 is an example of the first recessed portion. Each recessed portion 11*aj* in the filter device 1B is constituted by the three recessed portions 11*aj*1, 11*aj*2, and 11*aj*3. The recessed portion B1 of Example 1 was constituted by two recessed portions B11 and B12. The shape of each of the recessed portions B11 and B12 was a rectangular parallelepiped shape having a width of 100 μm, a length of 1550 μm, and a depth of 250 μm. The recessed portions B11 and B12 were separated from each other by a distance of 100 μm. In plan view, the strip-shaped conductor A1 and the recessed portion B11 were separated from each other by a distance of 25 μm, and the recessed portion B12 and the strip-shaped conductor A2 were separated from each other by a distance of 25 μm.

Example 2

As shown in (b) of FIG. 9, the structure of Example 2 could be obtained by modifying the structure of Example 1 so that a recessed portion C1 was provided in an area of the second main surface of the substrate which area overlapped the strip-shaped conductor A1 in plan view and a recessed portion C2 was provided in an area of the second main surface of the substrate which area overlapped the strip-shaped conductor A2 in plan view. Each of the recessed portions C1 and C2 is an example of the second recessed portion. The recessed portion C1 was constituted by recessed portions C11 and C12, and the recessed portion C2 was constituted by recessed portions C21 and C22. The shape of each of the recessed portions C11, C12, C21, and C22 was a rectangular parallelepiped shape having a width of 100 μm, a length of 1550 μm, and a depth of 250 μm. The recessed portions C11 and C12 were separated from each other by a distance of 100 μm, and the recessed portions C21 and C22 were separated from each other by a distance of 100 μm. A distance between a longer side of the strip-shaped conductor A1 and the recessed portion C11 was 25 μm, and a distance between a longer side of the strip-shaped conductor A1 and the recessed portion C12 was 25 μm. It can be said that the structure of Example 2 was obtained by modifying the recessed portions 11*a*1, 11*a*2, 11*d*1, 11*d*2, and 11*d*3 in the filter device 2 shown in FIG. 5.

Example 3

The structure of Example 3 could be obtained by modifying the structure of Example 2 shown in (b) of FIG. 9 so that the depth of each of the recessed portions C1 and C2 was changed from 250 μm to 300 μm. Thus, in plan view, the structure of Example 3 was identical to the structure of Example 2.

Comparative Example 1

The structure of Comparative Example 1 could be obtained by modifying Example 1 shown in (a) of FIG. 9 so that the recessed portion B1 was excluded therefrom. In Comparative Example 1, no recessed portion was formed in the first main surface or the second main surface of the substrate.

Comparative Example 2

As shown in (c) of FIG. 9, the structure of Comparative Example 2 could be obtained by modifying the structure of Comparative Example 1 so that a recessed portion D1 was provided in an area of the first main surface of the substrate which area was not provided with the strip-shaped conductor A1 or A2 and which area was interposed between the strip-shaped conductors A1 and A2 adjacent to each other. The structure of Comparative Example 2 corresponds to the structure shown in FIG. 1 of Patent Literature 1.

As shown in (a) of FIG. 10, coupling coefficients k obtained from the transmission properties of Examples 1, 2, and 3 were 0.0864, 0.0621, and 0.0466, respectively.

Meanwhile, as shown in (b) of FIG. 10, coupling coefficients k obtained by the transmission properties of Comparative Examples 1 and 2 were 0.185 and 0.149, respectively.

The above result reveals the following. That is, the structure of Comparative Example 2 could yield a smaller coupling coefficient k than that of the structure of Comparative Example 1 without a recessed portion. Meanwhile, all of Examples 1, 2, and 3 could yield a smaller coupling coefficient k than that of Comparative Example 2. That is, the above result reveals that, if a filter device in accordance with an aspect of the present invention is designed to have the same coupling coefficient as those of the conventional techniques, the filter device can be produced to have a smaller size than filter devices in accordance with the conventional techniques.

Aspects of the present invention can also be expressed as follows:

A filter device in accordance with a first aspect of the present invention includes: a substrate which is made of a dielectric and which includes a first main surface and a second main surface facing each other; strip-shaped conductors which are provided to the first main surface and adjacent ones of which are electromagnetically coupled to each other; and a ground conductor layer provided at least to the second main surface, wherein an area of the first main surface which area is interposed between adjacent ones of the strip-shaped conductors is designated as an intermediate area, and an area of the second main surface which area faces the intermediate area has one or more first recessed portions having a surface covered with the ground conductor layer.

As compared to a filter device including a substrate without a recessed portion (e.g., the filter device illustrated in FIG. 3 of Patent Literature 1), the above configuration can reduce the degree of coupling between adjacent ones of the strip-shaped conductors. Thus, if the filter device is designed such that the degree of coupling between the adjacent ones of the strip-shaped conductors is substantially the same as those in conventional ones, a distance between the adjacent ones of the strip-shaped conductors can be made narrower. Consequently, the filter device can be reduced in size than the conventional ones. The reason for this is as follows. As compared to a filter device in which a recessed portion is not provided at a portion of the substrate which portion is interposed between strip-shaped conductors adjacent to each other, the above configuration, which has the recessed portion, i.e., an air layer, at a portion of the substrate which portion is interposed between strip-shaped conductors adjacent to each other, can reduce lines of electric force between the strip-shaped conductors adjacent to each other.

A filter device in accordance with a second aspect of the present invention employs, in addition to the feature of the filter device in accordance with the first aspect above, a feature wherein: when seen along a lengthwise direction along which the strip-shaped conductors extend, two end portions of each of the first recessed portions protrude more than two end portions of each of two strip-shaped conductors adjacent to the first recessed portion.

With the above configuration, the ground conductor layer provided to the bottom surfaces of the recessed portions has a sufficient size as a ground conductor layer constituting a microstrip line.

A filter device in accordance with a third aspect of the present invention employs, in addition to the feature of the filter device in accordance with the first or the second aspect above, a feature wherein: in the second main surface, one or more second recessed portions are provided for each of the strip-shaped conductors, the one or more second recessed portions overlapping the each of the strip-shaped conductors when seen in plan view, the one or more second recessed portions having a surface covered with the ground conductor layer.

With the above configuration, a distance between each strip-shaped conductor and a portion of the ground conductor layer which portion is closest to the each strip-shaped conductor is reduced. Due to this, lines of electric force generated between the strip-shaped conductors and such portions of the ground conductor layer are concentrated in a direction normal to the first main surface, and are hardly expanded in an in-plane direction of the first main surface. Thus, coupling between adjacent ones of the strip-shaped conductors can be further weakened.

A filter device in accordance with a fourth aspect of the present invention employs, in addition to the feature of the filter device in accordance with the third aspect above, a feature wherein: a depth of each of the first recessed portions is greater than a depth of each of the second recessed portions.

With the above configuration, coupling between adjacent ones of the strip-shaped conductors can be further weakened.

A filter device in accordance with a fifth aspect of the present invention employs, in addition to the feature of the filter device in accordance with the third or fourth aspect above, a feature wherein: when seen along a lengthwise direction in which the strip-shaped conductors extend, each of the one or more second recessed portions (i) has a length longer than a length of one of the strip-shaped conductors overlapping the second recessed portion in plan view and (ii) covers the one of the strip-shaped conductors in plan view.

With the above configuration, the ground conductor layer provided to the bottom surfaces of the recessed portions has a sufficient size as a ground conductor layer constituting a microstrip line.

A filter device in accordance with a sixth aspect of the present invention employs, in addition to the feature of the filter device in accordance with any one of the first to fifth aspects above, a feature wherein: one or more conductor posts are provided, for each of the strip-shaped conductors, in an area where the each of the strip-shaped conductors and a respective one of the second recessed portions overlap each other in the plan view, the one or more conductor posts short-circuiting the each of the strip-shaped conductors and the ground conductor layer.

With the above configuration, it is possible to short-circuit the strip-shaped conductors and the second recessed portions via the short conductor posts, thereby making it possible to provide a one-end short-circuited strip resonator having a minimum reactance.

A filter device in accordance with a seventh aspect of the present invention employs, in addition to the feature of the filter device in accordance with the third or fourth aspect above, a feature wherein: a portion of the ground conductor layer which portion is provided to the second main surface is designated as a first ground conductor layer and a portion of the ground conductor layer which portion covers the second recessed portions is designated as a second ground conductor layer; one end portion of each of the strip-shaped conductors protrudes from one of the second recessed portions overlapping the strip-shaped conductor in plan view; and one or more conductor posts are further provided for each of the strip-shaped conductors, the one or more conductor posts being disposed in an area where the one end portion and the first ground conductor layer overlap each other in plan view, the one or more conductor posts short-circuiting the one end portion and the first ground conductor layer, the one or more conductor posts constituting a two-conductor line together with a portion of the second ground conductor layer which portion covers a side surface of a corresponding one of the second recessed portions.

With the above configuration, in addition to the feature wherein each strip-shaped conductor and the portion of the second ground conductor layer which portion is provided to the bottom surface of it respective second recessed portion function as a two-conductor line, the one or more conductor posts and the portion of the second ground conductor layer which portion is provided to the side surface of the respective second recessed portion also function as a two-conductor line. Consequently, in the filter device in accordance with the seventh aspect, it is possible to reduce the lengths in the lengthwise direction of the strip-shaped conductors, thereby making it possible to reduce the filter device in size also in the lengthwise direction.

Supplementary Notes

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: filter device
11: substrate
111, 112: main surface (first main surface, second main surface)
11*a*1 and 11*a*2: first recessed portion
11*b*1 to 11*b*3, 11*c*1 to 11*c*4: conductor post
11*d*1 to 11*d*3: second recessed portion
12: conductor pattern
12*a*1 to 12*a*3: strip-shaped conductor
12*b*, 12*c*: coplanar line
12*b*1, 12*c*1: signal line
12*b*2, 12*b*3, 12*c*2, 12*c*3: ground conductor pattern
13: ground conductor layer
131, 132: first ground conductor layer, second ground conductor layer

The invention claimed is:

1. A filter device comprising:

a substrate which is made of a dielectric and which includes a first main surface and a second main surface facing each other;

strip-shaped conductors which are provided to the first main surface and adjacent ones of which are electromagnetically coupled to each other; and a ground conductor layer provided at least to the second main surface, wherein an area of the first main surface which area is interposed between adjacent ones of the strip-shaped conductors is designated as an intermediate area, and an area of the second main surface which area faces the intermediate area has one or more first recessed portions having a surface covered with the ground conductor layer, when seen along a lengthwise direction along which the strip-shaped conductors extend, each of the first recessed portions has a length longer than a length of each of two strip-shaped conductors adjacent to the first recessed portion in plan view.

2. The filter device as set forth in claim 1, wherein:

a portion of the ground conductor layer which portion is provided to the second main surface is designated as a first ground conductor layer and a portion of the ground conductor layer which portion covers the second recessed portions is designated as a second ground conductor layer;

one end portion of each of the strip-shaped conductors protrudes from one of the second recessed portions overlapping the strip-shaped conductor in the plan view; and one or more conductor posts are further provided for each of the strip-shaped conductors, the one or more conductor posts being disposed in an area where the one end portion and the first ground conductor layer overlap each other in the plan view, the one or more conductor posts short-circuiting the one end portion and the first ground conductor layer, the one or more conductor posts constituting a two-conductor line together with a portion of the second ground conductor layer which portion covers a side surface of a corresponding one of the second recessed portions.

3. The filter device as set forth in claim 1, wherein in the second main surface, one or more second recessed portions are provided for each of the strip-shaped conductors such that the one or more second recessed portions overlap the strip-shaped conductors respectively when seen in the plan view, the one or more second recessed portions having a surface covered with the ground conductor layer.

4. The filter device as set forth in claim 3, wherein a depth of each of the first recessed portions is greater than a depth of each of the second recessed portions.

5. The filter device as set forth in claim 3, wherein with respect to a lengthwise direction in which the strip-shaped conductors extend, each of the second recessed portions (i) has a length longer than a length of one of the strip-shaped conductors overlapping the second recessed portion in the plan view and (ii) covers the one of the strip-shaped conductors in the plan view.

6. The filter device as set forth in claim 3, wherein one or more conductor posts are provided, for each of the strip-shaped conductors, in an area where the each of the strip-shaped conductors and a respective one of the second recessed portions overlap each other in the plan view, the one or more conductor posts short-circuiting the each of the strip-shaped conductors and the ground conductor layer.

* * * * *